United States Patent [19]

Pestoor

[11] 4,368,998
[45] Jan. 18, 1983

[54] TUBE ASSEMBLING DEVICE
[75] Inventor: James J. Pestoor, Kalamazoo, Mich.
[73] Assignee: Corners, Ltd., Kalamazoo, Mich.
[21] Appl. No.: 245,025
[22] Filed: Mar. 18, 1981
[51] Int. Cl.³ .......................... F16D 1/00; F16D 3/00; F16L 41/00
[52] U.S. Cl. .................................. 403/171; 403/176; 403/406; 403/295
[58] Field of Search ............... 403/171, 172, 176, 231, 403/295, 406

[56] References Cited

U.S. PATENT DOCUMENTS

| 3,542,407 | 11/1970 | Brown | 403/172 |
| 3,711,133 | 1/1973 | Werner | 403/172 |
| 3,854,831 | 12/1974 | Gutner | 403/231 X |
| 4,299,508 | 11/1981 | Kerscher et al. | 403/267 X |

FOREIGN PATENT DOCUMENTS 2155234 5/1973 Fed. Rep. of Germany ...... 403/171

Primary Examiner—Wayne L. Shedd
Attorney, Agent, or Firm—Gordon W. Hueschen

[57] ABSTRACT

The invention relates to a device for coupling or plugging square tubes, which comprises a hollow base member having a hollow coupling member projecting therefrom and, if desired, one or more other coupling members projecting from the base member. The other coupling members have axial partitions in the mid-portions thereof, at least the mid-portion of which is thick enough to receive a sheet metal screw and, if desired, there is provided a plug for the hollow coupling member for receiving a sheet metal screw.

19 Claims, 8 Drawing Figures

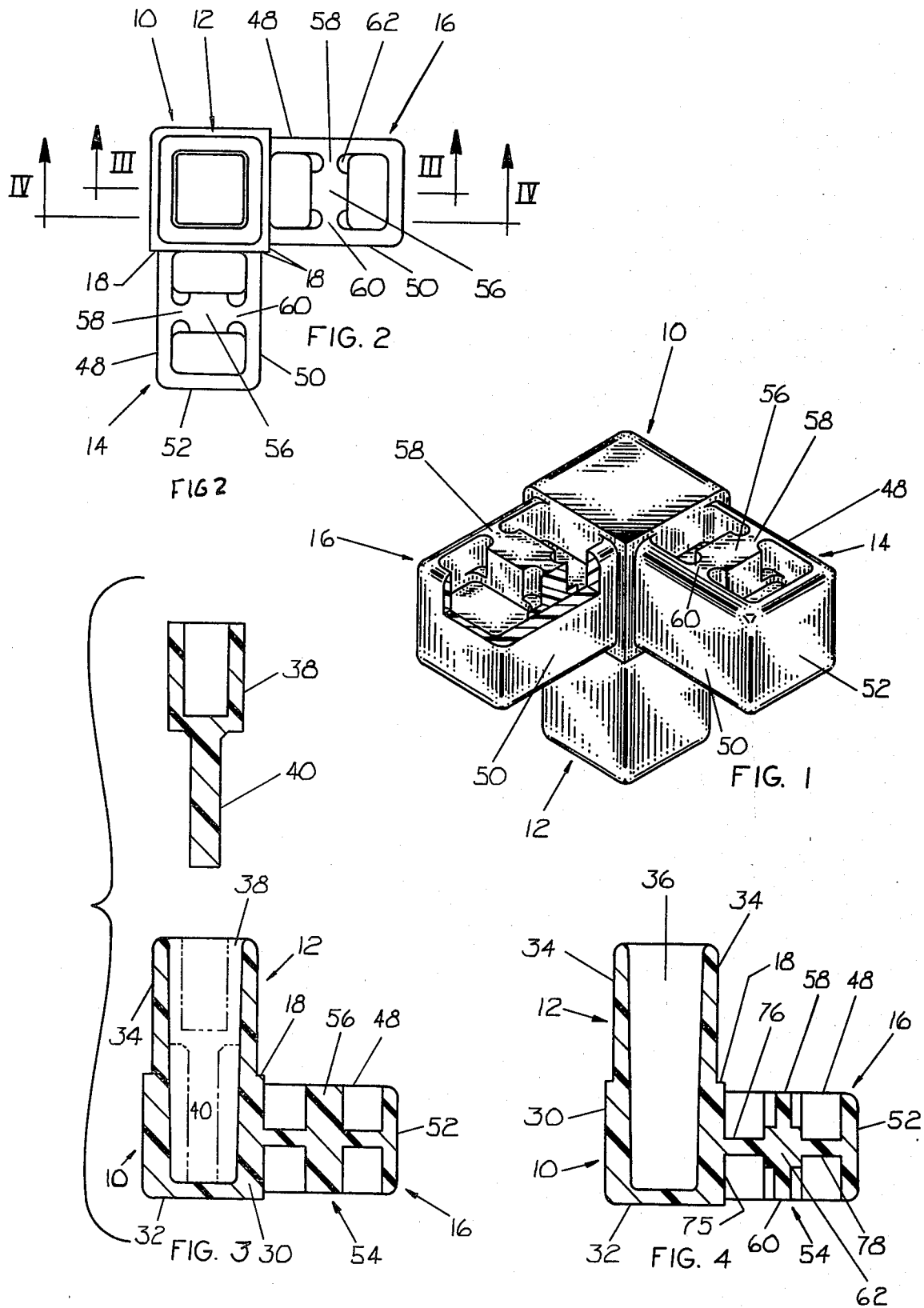

TUBE ASSEMBLING DEVICE

FIELD OF INVENTION AND PRIOR ART

This invention relates to a tube assembling device for coupling or plugging square tubes in the assembly of cages, furniture, and the like.

Tube coupling devices are known which comprise a base member having projecting coupling members. Such devices are commonly made of plastic moldings in which the base member and the coupling members are hollow. Tubular members are fastened thereto by friction, adhesive, or by sheet metal screws. However, such devices are not adequate for rugged structures, such as animal cages and the like.

OBJECTS OF THE INVENTION

It is an object of the invention to provide a new and improved tube coupling device. It is a further object of the invention to provide such devices which are especially adapted for making rugged structures. It is a further object of the invention to provide such devices in which the tubes can be secured thereto in a sure and certain manner. It is a further object of the invention to provide such devices which can be made in plastic molding machines simply and effectively.

Further objects of the invention are to avoid the disadvantages of the prior art and to obtain such advantages as will appear as the description proceeds.

BRIEF DESCRIPTION OF THE INVENTION

The invention relates to a tube assembling device for coupling or plugging square tubes. In a preferred form, it comprises a hollow base member; a first square-shaped, hollow coupling member projecting from the base member and having side walls substantially coincident with the walls of the base member; the hollow of the base member and the hollow of the first coupling member comprising a common bore which is open only at the free end of the first coupling member; a second coupling member comprising parallel side walls integral with and projecting from the base member to and integral with an end wall; and an axial partition parallel with the end wall and integral with and connecting the mid-portions of the side walls; the side and end walls of the second coupling member and the axial partition extending to and terminating in parallel planes which are normal to the base member, and the partition having a thickness, at least in the transverse or axial mid-portion thereof, preferably in both, which is substantially greater than the thickness of the side and end walls.

For the purpose of this description, the axis of the coupling device is to be considered the center line extending through the bore and the term axial means oriented in the same direction, i.e., parallel to the axis, and transverse means oriented crosswise of the axis.

Advantageously, the portions of the axial partition located adjacent the side walls and between the axial mid-portion are thinner than the axial mid-portion and have substantially the same order of thickness as the side and end walls. In such a structure, the axial and transverse mid-portions form a cross.

In a preferred form of the invention, either the transverse or axial mid-portion of the axial partition is integrally-connected to the base member and to the end wall by transverse or axial partitions. Advantageously, these partitions are transverse and are connected to the transverse mid-portion, are parallel to the afore-mentioned planes, and are integrally-connected with the mid-portions of the side walls. It is of advantage, too, if these partitions have a thickness which is in substantially the same order of thickness as the side and end walls.

In a preferred form of the invention, the base member is cube-shaped and each coupling member projects from a face thereof with its sides parallel to the edges of that face and spaced therefrom a distance equal to the thickness of the tubes to be coupled thereby, whereby, when the coupling device is inserted in a tube, any side face of the base member which does not have a coupling member projecting therefrom will lie in a common plane with a face of the tube fitted thereon.

In assembling a structure from the tube coupling device of the invention, a tube is fitted on the second coupling member and fastened thereto by fasteners which extend through the wall of the tube and into a mid-portion of the axial partition. This mid-portion is intentionally made thicker than the thickness of the walls in order to accommodate a sheet metal screw, or like fastener. Advantageously, the fastener is fastened into the end of the axial mid-portion of the second coupling member juxtaposed to a wall of the tube. Thus, when the second coupling member is inserted in the tube, the side walls are juxtaposed to opposed walls of the tube and the open portions are juxtaposed to the other two walls of the tube. Each of these latter will have the ends of the axial mid-portion in contact therewith. Thus, in a preferred form of the invention, the fastener projects through a tube wall into the end of the axial mid-portion which is juxtaposed thereto. It will be understood, however, that it could be passed through an adjacent side wall into a juxtaposed side wall of the second coupling member and then into the transverse mid-portion of the axial partition.

In order to effect a sturdy connection with the first coupling member which, in a broader aspect of the invention, need be the only coupling member associated with the base member, there is provided a hollow plug which can be inserted therein before the tube is fitted thereon. The plug, preferably, is hollow so that it can be rapidly molded in a molding machine; and is short, compared with the depth of the bore in the first coupling member. Stop means is provided to limit the distance it can be inserted into this bore and to keep the main portion of the plug adjacent the free end. The stop means can be either an extension of the plug which abuts the bottom of the bore, or it can be a rim at the top thereof which abuts the open end, or a complementary tapering of the bore and the plug. Before the plug is in place, the base member can be fastened to a fixed support, such as a wall, by passing a suitable fastener through the end wall thereof, provided, of course, it it does not have a coupling member thereon, and into the fixed support. When the plug is in place, a tube is slid over the first coupling member and a suitable fastener is passed through the tube wall, the wall of the coupling member, and into the plug, where it is anchored.

The coupling device of the invention as described provides not only for rigid and sturdy structures, but also for ease in molding. In any plastic operation, it is necessary to design the object so as to require a minimum of plastic. This is not so much on account of the plastic saved, but on account of the time required for effecting the molding. That is why, in the prior art devices, the first coupling member had a large bore which extended into the base member and the other coupling members similarly large bores which extended up to the base member. Thus, thin-walled construction is provided throughout and fast seal casting is obtained. These advantages are obtained, however, at the expense of sturdiness in the finished structure. The tube coupling device of the invention obtains these advantages in ease of molding and yet provides for markedly increased sturdiness in the final structure.

BRIEF DESCRIPTION OF THE DRAWINGS

In the drawings:

FIG. 1 is an isometric view of a tube coupling device according to the invention;

FIG. 2 is a plan view of the tube coupling device of the invention;

FIG. 3 is a side elevation is section taken along line III—III of FIG. 2;

FIG. 4 is a side elevation in section taken along line IV—IV of FIG. 2;

DETAILED DESCRIPTION OF THE INVENTION

Figure 5:
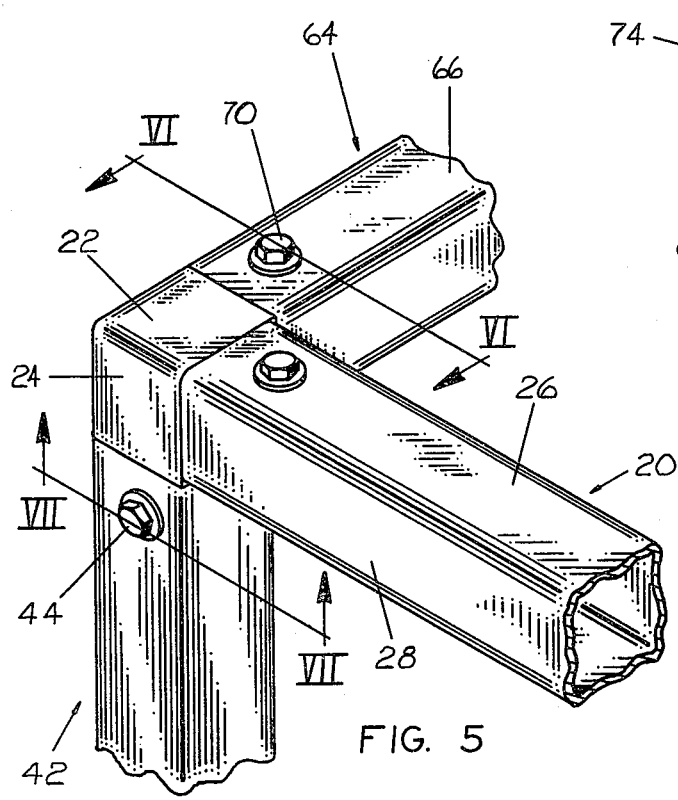
FIG. 5 is an isometric view of a corner of a cage according to the invention.

Referring now particularly to FIGS. 1, 2, 3, 4, and 8, there is shown a tube coupling device in the form of a corner having a base member 10, a first coupling member 12, a second coupling member 14, and a third coupling member 16. The base member 10 is in the shape of a cube and the coupling members 12, 14, and 16 project from faces of that cube and are centered in the faces to provide a margin 18 along each edge of the cube face, which has a dimension equal to the thickness of the tube which is fitted over the coupling member. Thus, when a tube 20 is fitted on a coupling member, as shown in FIG. 5, the exposed faces 22 and 24 of the base member will lie in the same plane as the sides 26 and 28, respectively, of the tube 20.

The base member 10 is hollowed out to provide side walls 30 and end wall 32. The first coupling member 12 similarly is hollowed out to provide side members 34 with the hollow thereof constituting, with the hollow of the base member 10, a common bore 36. The bore 36 is square in cross-section to provide relatively thin walls 34 and 30. It also tapers toward the bottom 30 to provide facile removal of the mold components.

Figure 8:
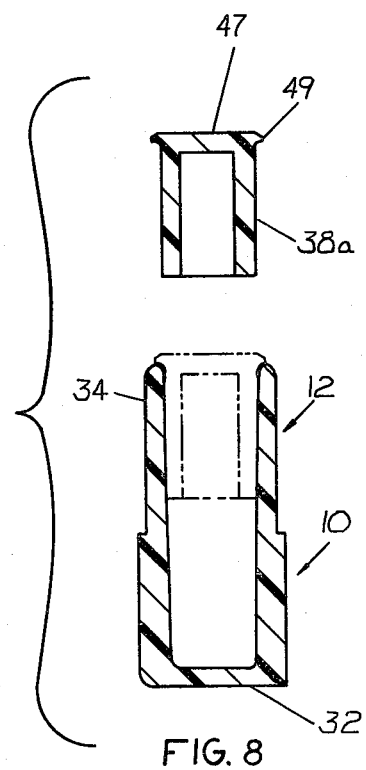
FIG. 8 is a cross-section of a modified form of the invention.

According to the structure desired, there may be provided a second, third, fourth, fifth, or sixth coupling member, or none at all, as shown in FIG. 8, in which case, the base member 10 and the coupling member 12 constitute a plug for insertion into the tube to form a foot, or to provide an anchor for anchoring the tube to a wall, or the like. In the latter case, the base member 10 would be fastened to the wall by a screw, or like fastener, passing through the end wall 32.

In order to firmly and securely fasten a tube to the coupling member 12, there is provided a tubular insert 38, shaped to fit in the upper portion of the bore 36, as shown in FIG. 3. The plug 38 has a leg 40 which acts as a stop to hold the plug 38 in the end portion of the coupling member 12, as shown in FIG. 3. When tube 42 is fitted over the coupling member 12, as shown in FIG. 5, it can be fastened thereto by sheet metal screw 44, which passes through the wall 46 of the tube 42, through the wall 34 of the coupling member 12 and into the hollow plug 38. It will be understood that the plug 38 need not be hollow except as it facilitates the molding or casting thereof.

In the modification shown in FIG. 8, the plug 38a has a cap 47, the lip 49 of which engages the end of the wall 34 to hold the plug in the position shown. Thus, the lip 49 functions as a stop to limit the insertion of the plug 38a, just as the leg 40 acts as a stop in the modification of FIG. 3. It will be understood that the leg 40 and the lip 49 can be eliminated where the bore 36 tapers appropriately, and the plug 38 or 38a has a corresponding taper which would prevent it from being inserted beyond the position shown in FIGS. 3 and 8. In that case, the taper functions as a stop means for limiting the insertion of the plug.

The other coupling members are constructed in the manner shown in FIGS. 1, 2, 3, and 4. Thus, they have side walls 48 and 50 which project from a face of the base member 12 and extend parallel to each other and normal to that face, to an end wall 52. The side walls 48 and 50 terminate in parallel planes which are normal to the face from which they project.

Spanning the mid-portions of the walls 48 and 50 and normal thereto is an axial partition 54. The axial mid-portion 56 of the axial partition 54 is enlarged to a thickness substantially greater than, say, about two times that of the side walls 48 and 50.

This enlarged axial mid-portion 56 is best seen in FIG. 3, where the section is taken on line III—III of FIG. 2. The portions 58 and 60 adjacent the walls 48 and 50, respectively, have a thickness substantially the same as the thickness of the walls 48 and 50.

The transverse mid-portion 62 is similarly enlarged. This is best seen in FIG. 4, where the section is taken along line IV—IV of FIG. 2. Thus, the axial partition 54 is embossed in the form of a cross formed by the mid-portions 56 and 62, one of which is axial and the other of which is transverse.

Figure 6:
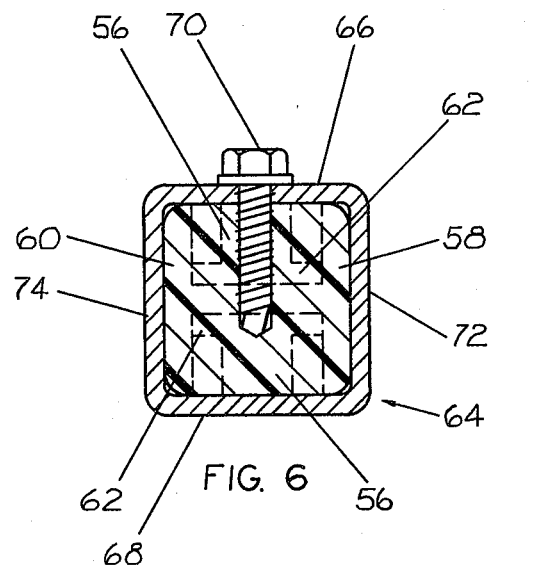
FIG. 6 is a cross-section taken along line VI—VI of FIG. 5.
Figure 7:
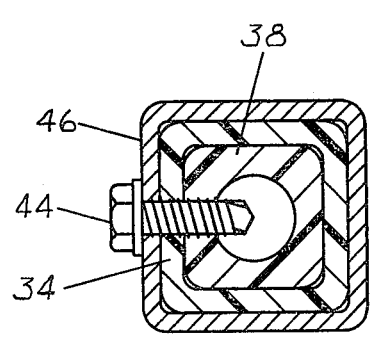
FIG. 7 is a cross-section taken along line VII—VII of FIG. 5.

The purpose of the enlarged portions 56 and 62 is to provide a secure anchor for a sheet metal screw, as shown in FIGS. 5 and 6. Thus, when a tube 64 is fitted on a coupling member of the second type, as shown in FIG. 6, the ends of the axial mid-portion 56 are juxtaposed to and in contact with the sides 66 and 68 thereof. The tube 64 is thus secured to the coupling member by a sheet metal screw 70 which passes through the side 66 and into the enlarged axial mid-portion 56. It will be understood that, if desired, the sheet metal screw can be passed through the side 72 or 74 through the side wall 58 or 60 and into the enlarged transverse mid-portion 62.

The transverse mid-portion 62 is connected to the face 75 by a transverse partition 76, which is normal to the side walls 48 and 50. Similarly, the transverse mid-portion 62 is connected to the end wall 52 by a corresponding transverse partition 78. If desired, the partitions 76 and 78 can be omitted or, they can be made parallel to the sides 48 and 50, that is, axial, though such construction is not as sturdy and rigid as that shown. Also, it is to be understood that the sides 48 and 50 can be rotated 90 degrees, so that the enlarged mid-portion 56 becomes transverse, instead of axial, and the enlarged mid-portion 62 becomes axial, instead of transverse. Such a structure is not so advantageous as that shown, because it requires additional parts for molding. It will be understood also, that the parts previously described, except the plugs 38 and 38a, are integral parts of a unitary casting.

The coupling device of the invention thus provides for the construction of rugged and durable frames of hollow, square tubing particularly suited for animal cages or the like. Thus, a rectangular framework can be constructed, as shown in FIG. 5, with hardware cloth or like screening fastened thereto by suitable fasteners.

It is to be understood that the invention is not to be limited to the exact details of construction, operation, or exact materials or embodiments shown and described, as obvious modifications and equivalents will be apparent to one skilled in the art, and the invention is therefore to be limited only by the full scope of the appended claims.

I claim:

1. A tube assembling device for square tubes which comprises:
   a hollow base member;
   a first square-shaped hollow coupling member projecting from and integral with said base member and having side walls substantially coincident with the walls of said base member, the hollow of said base member and the hollow of said first coupling member comprising a common bore which is open only at the free end of said first coupling member;
   a second coupling member comprising parallel side walls integral with and projecting from said base member to and integral with an end wall; and
   a transverse partition parallel with said end wall and integral with and connecting the mid-portions of said side walls; the side and end walls of said second coupling member and said transverse partition extending to and terminating in parallel planes which are normal to said base member, and said partition having a thickness, at least in the transverse or axial mid-portion thereof, which is substantially greater than the thickness of said side and end walls.

2. A tube assembling device of claim 1, in which the portions of said transverse partition adjacent said side walls are thinner than the axial mid-portion and have substantially the same order of thickness as said side and end walls.

3. A tube assembling device of claim 1, in which said transverse partition has a thickness, both in the transverse and axial mid-portions thereof substantially greater than the thickness of said side and end wall.

4. A tube assembling device of claim 2, in which said transverse partition has a thickness, both in the transverse and axial mid-portions thereof substantially greater than the thickness of said side and end wall.

5. A tube assembling device of claim 4, in which a mid-portion of said transverse partition is integrally-connected to said base member and said end wall by longitudinal partitions.

6. A tube assembling device of claim 5, in which said longitudinal partitions are parallel to said planes and are also integrally-connected with the mid-portions of said side walls.

7. A tube assembling device of claim 6, in which said longitudinal partitions have a thickness which is substantially in the same order of thickness as said side and end walls.

8. A tube assembling device of claim 1, in which said base member is cube-shaped and in which each said coupling member projects from a face of said base member with the sides parallel to the edges thereof and spaced therefrom a distance equal to the thickness of the tubes to be coupled thereby, whereby, when a coupling member is inserted into a tube, any side face of said base member which does not have a coupling member projecting therefrom, will lie in a common plane with a side of a tube when it is fitted on said coupling.

9. A tube assembling device of claim 8, which further comprises a hollow plug which is adapted to fit snugly into the bore of said first coupling member which is shorter than the depth of said bore, and stop means to limit the distance that said plug can be inserted into said bore such that, when said plug is inserted, it fills a substantial portion of said bore inward from the free end thereof.

10. A tube assembling device of claim 1, in which said plug is inserted in said first coupling member and a tube is fitted thereon and secured thereto by a fastener passing through a wall of said tube and the juxtaposed wall of said coupling member and into and anchored in said plug.

11. A tube assembling device of claim 1, in which a tube is fitted onto said second coupling member and fastened thereto by a fastener which extends through a wall of said tube and into a mid-portion of said transverse partition.

12. A tube assembling device of claim 1, in which a tube is fitted on said second coupling member with opposite tube walls thereof juxtaposed to and in contact with the ends of the axial mid-portion of said transverse partition and at least one said tube wall is fastened to said second coupling member by a fastener extending through said tube wall into a juxtaposed end of said axial mid-portion.

13. A tube assembling device for square tubes which comprises:
   a hollow base member;
   a square-shaped, hollow coupling member projecting from and integral with said base member and having side walls substantially coincident with the walls of said base member, the hollow of said base member and the hollow of said coupling member comprising a common bore which is open only at the free end of said coupling member and extends to the bottom wall of said base member; and a plug which is adapted to fit snugly into the bore of said first coupling member and which is shorter than the depth of said bore, and stop means to limit the distance that said plug can be inserted into said bore such that, when said plug is inserted, it fills a substantial portion of said bore inward from the free end thereof.

14. A tube plugging device of claim 13, in which said plug is inserted in said first coupling member and a tube is fitted thereon and secured thereto by a fastener extending through a wall of said tube and the juxtaposed wall of said coupling member into said plug.

15. A tube assembling device of claim 1, in which said bore tapers to said base wall.

16. A tube assembling device of claim 9, in which said bore tapers to said base wall.

17. A tube assembling device of claim 13, in which said bore tapers to said base wall.

18. A tube assembling device of claim 14, in which said bore tapers to said base wall.

19. A tube assembly device of claim 13, which further comprises a tube fitted on said coupling member and fastened thereto by a fastener passing through juxtaposed walls of said tube and said coupling member and into and anchored in said plug.

* * * * *